United States Patent
Keys et al.

(10) Patent No.: US 7,856,763 B2
(45) Date of Patent: Dec. 28, 2010

(54) TRUSS HOLD-DOWN CONNECTORS AND METHODS FOR ATTACHING A TRUSS TO A BEARING MEMBER

(75) Inventors: Travis J. Keys, Maplewood, MO (US); Michael A. Pellock, Edwardsville, IL (US)

(73) Assignee: Mitek Holdings, Inc., Wilmington, DE (US)

( * ) Notice: Subject to any disclaimer, the term of this patent is extended or adjusted under 35 U.S.C. 154(b) by 1087 days.

(21) Appl. No.: 11/415,540

(22) Filed: May 2, 2006

(65) Prior Publication Data
US 2007/0209312 A1    Sep. 13, 2007

Related U.S. Application Data

(63) Continuation-in-part of application No. 11/369,282, filed on Mar. 7, 2006, now abandoned.

(51) Int. Cl.
*E04B 1/38* (2006.01)
*E04C 3/02* (2006.01)

(52) U.S. Cl. .................. 52/92.2; 52/93.2; 52/712; 52/713; 52/715; 403/232.1

(58) Field of Classification Search .......... 52/702, 52/289, 712, 714, 715, 691, 633, 634, 696, 52/639, 655.1, 93.2, 92.2, 293.3, 296, 297, 52/713; 403/232.1, DIG. 15, 187, 188, 233, 403/234, 235, 237, 262
See application file for complete search history.

(56) References Cited

U.S. PATENT DOCUMENTS

| 625,427 | A |  | 5/1899 | Stewart et al. |
| 1,051,301 | A |  | 1/1913 | Wills |
| 1,538,218 | A |  | 5/1925 | Seelye |
| 1,877,898 | A |  | 9/1932 | Kotrbaty |
| 2,700,457 | A | * | 1/1955 | Munroe ................. 206/320 |
| 2,704,868 | A | * | 3/1955 | Danielson ............... 52/210 |
| 3,188,696 | A |  | 6/1965 | Earhart |
| 3,304,677 | A |  | 2/1967 | Pavlecka |
| 3,416,821 | A | * | 12/1968 | Benno .................... 411/458 |
| 3,537,221 | A |  | 11/1970 | Helfman et al. |
| D224,083 | S |  | 7/1972 | Gilb |
| 4,067,168 | A |  | 1/1978 | Thurner |

(Continued)

OTHER PUBLICATIONS

The Steel Network, Load Bearing Wall Systems, Stiffwall® SW-R, p. 57, Apr. 2008.

(Continued)

*Primary Examiner*—Robert J Canfield
*Assistant Examiner*—Jessie Fonseca
(74) *Attorney, Agent, or Firm*—Senniger Powers LLP

(57) ABSTRACT

A truss hold-down connector for attaching metal trusses to a bearing member. One embodiment of the truss hold-down connector has a vertical connector web that has a bottom attachment leg protruding therefrom for attachment to a bearing member and first and second attachment tab portions for attachment to the flanges of a vertically extending truss web. Stiffeners may be embossed into the vertical connector web to provide the connector with additional strength. The first and second attachment tabs may be configured to enable pairs of identical connectors to be attached to vertically extending truss webs that have one or more diagonally extending truss webs attached thereto.

6 Claims, 14 Drawing Sheets

U.S. PATENT DOCUMENTS

| | | | |
|---|---|---|---|
| 4,192,118 A | 3/1980 | Gilb | |
| 4,196,556 A | 4/1980 | Russo | |
| 4,321,776 A | 3/1982 | Delight | |
| 4,330,971 A | 5/1982 | Auberger | |
| 4,530,194 A | 7/1985 | Linton et al. | |
| 4,560,301 A * | 12/1985 | Gilb | 403/232.1 |
| 4,665,672 A | 5/1987 | Commins et al. | |
| 4,744,192 A | 5/1988 | Commins | |
| 4,825,621 A | 5/1989 | Jensen | |
| 4,878,323 A | 11/1989 | Nelson | |
| 4,932,173 A * | 6/1990 | Commins | 52/92.2 |
| 5,092,097 A | 3/1992 | Young | |
| 5,109,646 A | 5/1992 | Colonias et al. | |
| 5,150,982 A | 9/1992 | Gilb | |
| 5,214,899 A | 6/1993 | Beeche et al. | |
| 5,217,317 A * | 6/1993 | Young | 403/232.1 |
| 5,249,404 A | 10/1993 | Leek et al. | |
| 5,375,384 A | 12/1994 | Wolfson | |
| 5,403,110 A * | 4/1995 | Sammann | 403/234 |
| 5,457,927 A | 10/1995 | Pellock et al. | |
| 5,467,570 A | 11/1995 | Leek | |
| 5,697,725 A * | 12/1997 | Ballash et al. | 403/231 |
| 5,797,694 A * | 8/1998 | Breivik | 403/231 |
| 5,857,306 A | 1/1999 | Pellock | |
| 5,970,678 A | 10/1999 | Pellock et al. | |
| 5,979,130 A | 11/1999 | Gregg et al. | |
| 6,003,280 A | 12/1999 | Wells | |
| 6,006,487 A | 12/1999 | Leek | |
| 6,018,917 A | 2/2000 | Leek | |
| 6,088,982 A * | 7/2000 | Hiesberger | 52/241 |
| 6,094,880 A | 8/2000 | Thompson | |
| 6,112,495 A | 9/2000 | Gregg et al. | |
| 6,158,188 A | 12/2000 | Shahnazarian | |
| 6,219,975 B1 | 4/2001 | Olden | |
| 6,230,466 B1 * | 5/2001 | Pryor | 52/702 |
| 6,240,682 B1 * | 6/2001 | James et al. | 52/90.2 |
| 6,244,004 B1 | 6/2001 | Timmerman, Sr. et al. | |
| 6,250,041 B1 | 6/2001 | Seccombe | |
| 6,260,327 B1 * | 7/2001 | Pellock | 52/643 |
| 6,295,781 B1 * | 10/2001 | Thompson | 52/712 |
| 6,393,794 B1 | 5/2002 | Pellock | |
| 6,397,527 B1 | 6/2002 | Pellock | |
| 6,401,423 B1 | 6/2002 | Bergeron et al. | |
| 6,430,890 B1 * | 8/2002 | Chiwhane et al. | 52/715 |
| 6,446,409 B1 * | 9/2002 | Emerson | 52/712 |
| 6,453,634 B1 | 9/2002 | Pryor | |
| 6,460,297 B1 | 10/2002 | Bonds et al. | |
| 6,484,460 B2 | 11/2002 | VanHaitsma | |
| 6,513,290 B2 | 2/2003 | Leek | |
| 6,523,322 B1 | 2/2003 | Michalski et al. | |
| 6,625,945 B2 | 9/2003 | Commins | |
| 6,640,516 B1 * | 11/2003 | Thompson | 52/712 |
| 6,892,504 B1 | 5/2005 | diGirolamo et al. | |
| 6,931,813 B2 * | 8/2005 | Collie | 52/713 |
| 6,941,712 B2 | 9/2005 | Sukup et al. | |
| 7,007,432 B2 | 3/2006 | Commins | |
| 7,014,383 B2 | 3/2006 | Schmid et al. | |
| 7,127,862 B2 | 10/2006 | Saldana | |
| 7,168,343 B2 | 1/2007 | Leek et al. | |
| 7,251,920 B2 | 8/2007 | Timmerman, Sr. et al. | |
| 7,296,386 B2 | 11/2007 | Leek | |
| 7,296,501 B2 | 11/2007 | Leek et al. | |
| 2002/0002806 A1 | 1/2002 | Commins et al. | |
| 2002/0108332 A1 | 8/2002 | Timmerman, Sr. et al. | |
| 2003/0009980 A1 | 1/2003 | Shahnazarian | |
| 2003/0024174 A1 | 2/2003 | Bonds et al. | |
| 2004/0049993 A1 | 3/2004 | Saldana | |
| 2004/0065032 A1 | 4/2004 | Commins | |
| 2004/0068947 A1 | 4/2004 | Commins et al. | |
| 2004/0079034 A1 * | 4/2004 | Leek | 52/92.2 |
| 2004/0134159 A1 | 7/2004 | Shahnazarian | |
| 2005/0011157 A1 | 1/2005 | Lutz et al. | |
| 2005/0155314 A1 * | 7/2005 | Banta | 52/720.1 |
| 2006/0053714 A1 | 3/2006 | Pryor et al. | |
| 2006/0096230 A1 * | 5/2006 | Liescheidt et al. | 52/633 |
| 2006/0201285 A1 | 9/2006 | Leek et al. | |
| 2006/0213136 A1 | 9/2006 | Lin | |
| 2007/0006691 A1 | 1/2007 | Leek et al. | |
| 2007/0107338 A1 | 5/2007 | Daudet | |
| 2007/0113516 A1 | 5/2007 | Daudet | |
| 2007/0209311 A1 | 9/2007 | Keys | |
| 2007/0245677 A1 | 10/2007 | Nguyen et al. | |

OTHER PUBLICATIONS

Office Action issued on Apr. 13, 2009 in U.S. Appl. No. 11/369,282.
U.S. Appl. No. 11/511,553, filed Aug. 29, 2006, Daudet.
Simpson Strong-Tie Co., Inc., Light Gauge Steel Construction Connectors, Aug. 1, 2001, pp. 1-19.
The Steel Network, Inc., Load Bearing Wall Systems Brochure, Jun. 2004, pp. 2 and 28-48.
Simpson Strong-Tie Co., Inc., Wood Construction Connectors Brochure, Jan. 1, 2001, pp. 20-26, 34-36, 105, and 131.
Aegis Metal Framing, LLC, Changing the Game of Light Gauge Steel Construction, 2002, pp. 1-24, Chesterfield, Missouri.
Canadian Search Report for Canadian Application No. 2,578,649 dated Sep. 29, 2008 (2 pages).

* cited by examiner

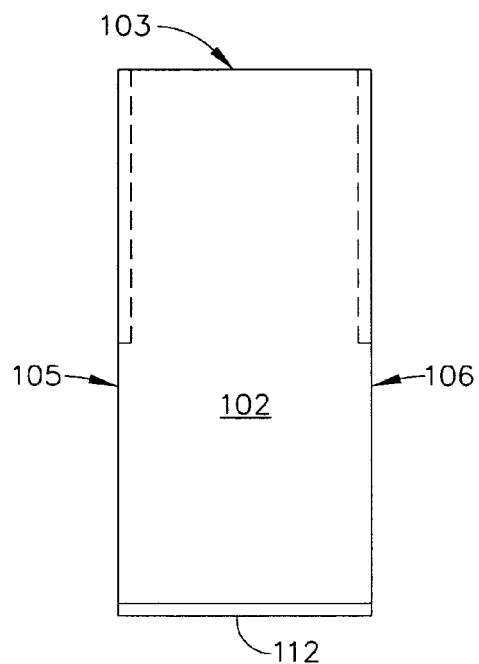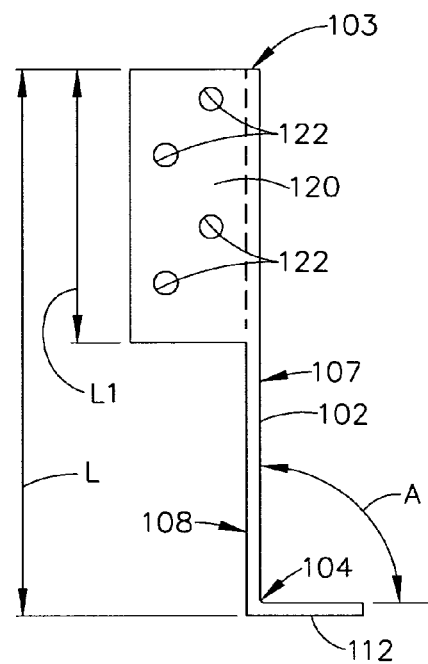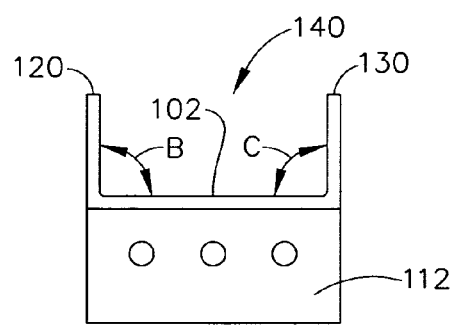
FIG. 5
FIG. 7
FIG. 6

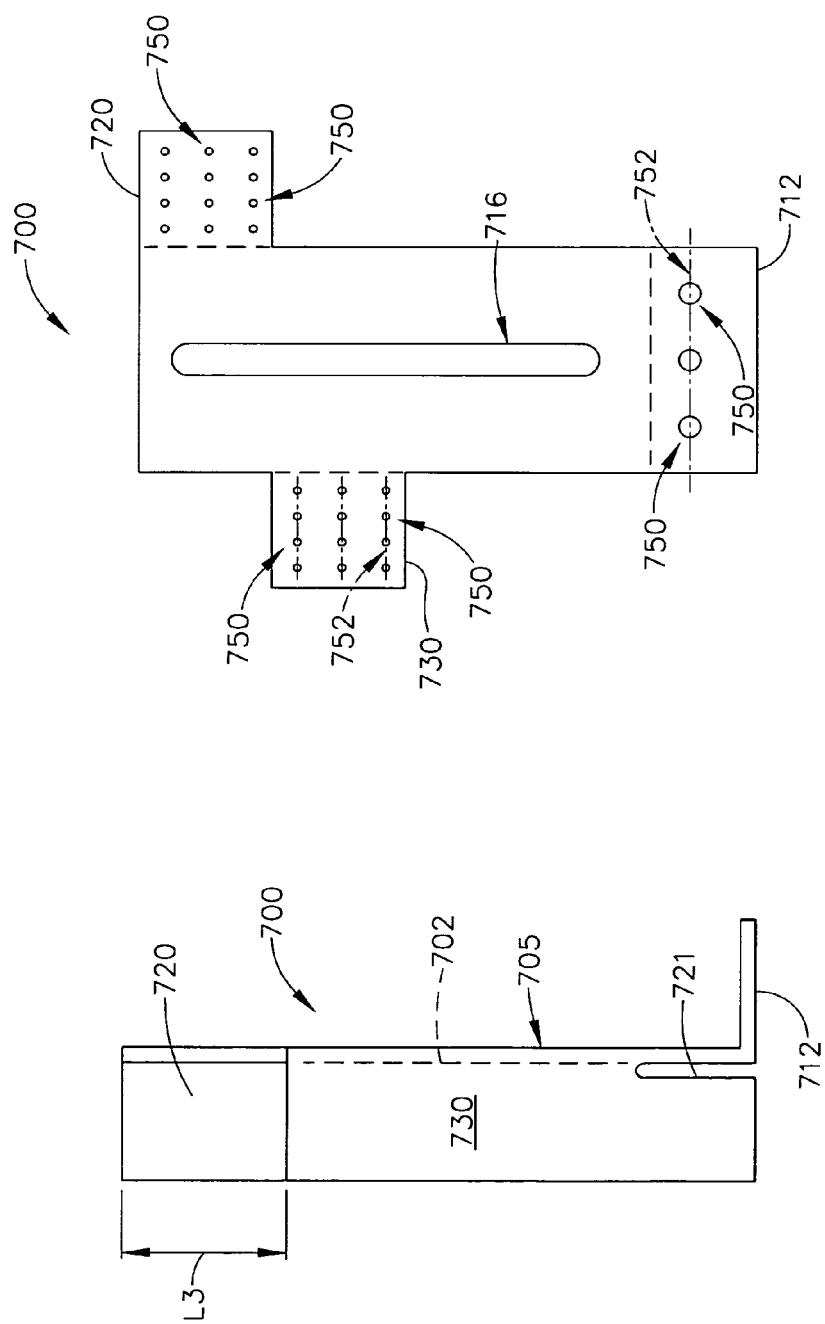

TRUSS HOLD-DOWN CONNECTORS AND METHODS FOR ATTACHING A TRUSS TO A BEARING MEMBER

CROSS-REFERENCE TO RELATED APPLICATIONS

This application is a continuation-in-part application of U.S. patent application Ser. No. 11/369,282, filed Mar. 7, 2006, now abandoned, the disclosure of which is herein incorporated by reference in its entirety.

BACKGROUND OF THE INVENTION

1. Field of the Invention

The invention relates to building construction components and, more particularly, to connectors for anchoring trusses to bearing members such as, for example, girders, beams, walls, etc. in commercial and residential structures.

2. Description of the Invention Background

Trusses are used in the construction of residential and commercial buildings to provide support for decking such as roof sheathing and flooring. The upper and lower portions of the truss are known as the "chords" and the members that extend between the chords are called "webs".

Traditionally, trusses used in residential structures for were constructed from wood. However, due to the rising costs of lumber and its vulnerability to fire and insect damage, rotting, etc. many homebuilders are now turning to steel as the framing material of choice. Indeed, steel framing materials are rapidly gaining acceptance among homebuilders and homeowners alike due to their cost effectiveness, dimensional stability, noncombustibility, insect resistance, durability, high strength-to-weight ratio and recycleability. These advantages have long been recognized by the commercial construction industry wherein steel has been the material of choice for several decades.

U.S. Pat. No. 5,457,927, entitled "Truss" discloses a truss that is fabricated from cold rolled sheet metal structural members that, among other things, enable the truss to be fabricated with the chord members lying flat on a fabrication table and result in a truss that can be stacked flatwise with a plurality of like-constructed trusses for storage and delivery. FIG. 1 illustrates a portion of a prior truss 10 constructed utilizing an elongated chord 12 of the type and construction disclosed in U.S. Pat. No. 5,457,927. The chord 12 has a web 14 that has first and second lateral faces 15, 16. A top flange 17 extends laterally outwardly from the first face 15. A "reentrant portion" 18 protrudes outward from the second face 16 and is constructed to be supported on a bearing member, girder, I beam, etc. 20.

A reentrant lip 19 is formed on the reentrant portion 18 such that the ends of truss webs 30 may be received between the reentrant lip 19 and the second face 16 of the web 14. The truss webs 30 are commonly formed from studs 32 that each have a web 34 and flanges 36 protruding therefrom. A return 38 is formed on the end of each of the flanges 36 as shown. Another chord 12' may be attached to the top ends of the webs 30 to form the top chord of the truss 10. The web 34 of each stud 32 is attached to the webs 14, 14' of the truss chords 12, 12' by fasteners such as self tapping screws, etc.

In the prior arrangement depicted in FIG. 1, the bottom chord 12 of the truss 10 is supported on the bearing member 20 and attached thereto by a pair of connectors. As can be seen in that Figure, a first C-shaped connector 40 is attached to the flanges 36 of the stud 32. The C-shaped connector 40 has a connector web 40 and a pair of connector flanges 42. The connector flanges 42 are connected to the corresponding stud flanges by a plurality of self tapping screws 43 or the like. After the C-connector 40 is attached to the stud 32 as shown in FIG. 1, a second L-shaped clip 50 is employed to fasten the truss 10 to the bearing member 20. The L-shaped clip 50 has an upper leg 52 that is connected to the web 40 by a plurality of the fastener screws 55 and a lower leg 54 that is attached to the bearing member 20 by a plurality of fastener screws 57.

The above-mentioned connector arrangement has several disadvantages. First, this method of attachment requires two different types of connectors to be inventoried and available at the job site. Second, this method of attachment is more labor intensive because the installer must first attach the first connector 40 to the web, then the L-shaped clip 50 must be attached to the first connector 40 and to the bearing member 20. Third, the fasteners that are employed to attach the first connector 40 to the stud can interfere with the installation of additional truss webs that extend diagonally from the end of the stud to the upper chord 12'.

Thus, as can be appreciated from the forgoing discussion, there is a need for a connector for attaching a truss to a bearing member without the several disadvantages encountered when using prior connector arrangements.

SUMMARY

In accordance with one embodiment of the present invention, there is provided truss hold-down connector that comprises a vertical connector web having a top end, a bottom end and a web length. The vertical connector web further has a front face, a rear face and first and second longitudinal edges. A bottom attachment leg configured for attachment to a bearing member protrudes outward from the front face at the bottom end of the vertical connector web. A first attachment tab protrudes from a portion of the first longitudinal edge adjacent the top end of the vertical connector web and extends outward therefrom. A second attachment tab protrudes from a portion of the second longitudinal edge adjacent the top end of the vertical connector web and extends outward therefrom such that the second attachment tab is substantially parallel to the first attachment tab to define a truss web receiving area therebetween adjacent at least a portion of the rear face of the vertical connector web for receiving a portion of a truss therein.

In accordance with another embodiment of the subject invention, there is provided a truss assembly that comprises a bottom truss chord and at least one top truss chord that is spaced from the bottom truss chord. At least one truss web extends between the bottom truss chord and the top truss chord and is attached thereto. The truss assembly further comprises at least one truss hold-down connector that corresponds to one of the truss webs. The truss hold-down connector comprises a vertical connector web that has a top end, a bottom end and a web length. The vertical connector web further has a front face, a rear face and first and second longitudinal edges. A bottom attachment leg configured for attachment to a bearing member protrudes outward from the front face at the bottom end of the vertical connector web. A first attachment tab protrudes from a portion of the first longitudinal edge adjacent the top end of the vertical connector web and extends outward therefrom. A second attachment tab protrudes from a portion of the second longitudinal edge adjacent the top end of the vertical connector web and extends outward therefrom such that the second attachment tab is substantially parallel to the first attachment tab to define a truss web receiving area therebetween adjacent at least a portion of the rear face of the vertical connector web for receiving a portion of the corresponding truss web therein.

In accordance with yet another embodiment of the subject invention, there is provided a method of attaching a truss to a bearing member. In various forms, the method comprises providing a truss hold-down connector that includes a vertical web that has a top end, a bottom end and a web length. The vertical web further has a front face, a rear face and first and second longitudinal edges. A bottom attachment leg protrudes outward from the front face at the bottom end of the vertical web. A first attachment tab protrudes from a portion of the first longitudinal edge adjacent the top end of the vertical web and extends outward therefrom. A second attachment tab protrudes from a portion of the second longitudinal edge adjacent the top end of the vertical web and extends outward therefrom such that the second attachment tab is substantially parallel to the first attachment tab to define a web receiving area therebetween adjacent at least a portion of the rear face of the vertical web. The method further includes attaching at least one of the first and second attachment tabs to a vertically extending web of the truss and attaching the attachment leg to the bearing member.

In accordance with other various embodiments of the present invention there is provided a truss hold-down connector that comprises a vertical connector web that has a top edge, a bottom end, a front face, a rear face and first and second longitudinal edges. A bottom attachment leg protrudes outward from the front face at the bottom end of the vertical connector web. The bottom attachment leg is configured for attachment to a bearing member. A first attachment tab protrudes from a portion of the first longitudinal edge adjacent the top edge of the vertical connector web. The first attachment tab extends outward therefrom and has a first longitudinal length. A second attachment tab protrudes from a portion of the second longitudinal edge and is spaced a longitudinally offset distance from the top edge that is greater than or equal to the first longitudinal length of the first attachment tab. The second attachment tab extends outward therefrom such that the second attachment tab is substantially parallel to and longitudinally offset from the first attachment tab to define a truss web receiving area therebetween adjacent at least a portion of the rear face of the vertical connector web for receiving a portion of a truss therein.

In accordance with yet other various embodiments of the present invention there is provided a truss assembly that comprises a bottom truss chord that has a front side and a rear side. At least one truss web is attached to the bottom truss chord adjacent to one of the front and rear sides thereof. A pair of truss hold-down connectors corresponds to one of the at least one truss webs. Each truss hold-down connector comprises a vertical connector web that has a top edge, a bottom end, a front face, a rear face and first and second longitudinal edges. A bottom attachment leg protrudes outward from the front face at the bottom end of the vertical connector web. The bottom attachment leg is configured for attachment to a bearing member. A first attachment tab protrudes from a portion of the first longitudinal edge adjacent the top edge of the vertical connector web and extends outward therefrom. The first attachment tab has a first longitudinal length. A second attachment tab protrudes from a portion of the second longitudinal edge and has a second longitudinal length. The second attachment tab is spaced a longitudinally offset distance from the top edge that is greater than or equal to the first longitudinal length of the first attachment tab and extends outward therefrom such that the second attachment tab is substantially parallel to and longitudinally offset from the first attachment tab to define a truss web receiving area therebetween adjacent at least a portion of the rear face of the vertical connector web for receiving a portion of the corresponding truss web therein.

In accordance with still other embodiments of the present invention, there is provided a truss hold-down attachment kit for attaching a truss having at least one vertically extending truss web to a bearing member. Various embodiments of the kit comprise a pair of truss hold-down connectors that each comprise a vertical connector web that has a top edge, a bottom end, a front face, a rear face and first and second longitudinal edges. A bottom attachment leg protrudes outward from the front face at the bottom end of the vertical connector web. The bottom attachment leg is configured for attachment to the bearing member. A first attachment tab protrudes from a portion of the first lateral edge adjacent to the top edge of the vertical connector web and extends outward therefrom. The first attachment tab has a first longitudinal length. A second attachment tab protrudes from a portion of the second lateral edge and is spaced a longitudinal distance from the top edge that is substantially greater than or equal to the first longitudinal length of the first attachment tab and extends outward therefrom such that the second attachment tab is substantially parallel to and longitudinally offset from the first attachment tab to define a truss web receiving area therebetween adjacent at least a portion of the rear face of the vertical connector web for receiving a portion of a truss therein.

In accordance with other various embodiments of the present invention there is provided a method of attaching a truss to a bearing member that comprises providing a pair of truss hold-down connectors that each comprise a vertical connector web. The vertical connector web has a top edge, a bottom end, a front face, a rear face and first and second longitudinal edges. A bottom attachment leg protrudes outward from the front face at the bottom end of the vertical connector web. The bottom attachment leg is configured for attachment to a bearing member. A first attachment tab protrudes from a portion of the first longitudinal edge adjacent the top edge of the vertical connector web and extends outward therefrom. The first attachment tab has a first longitudinal length. A second attachment tab protrudes from a portion of the second longitudinal edge and is spaced a longitudinal distance from the top edge that is substantially greater than or equal to the first longitudinal length of the first attachment tab and extends outward therefrom such that the second attachment tab is substantially parallel to and longitudinally offset from the first attachment tab to define a truss web receiving area therebetween adjacent at least a portion of the rear face of the vertical connector web for receiving a portion of a truss therein. The method further comprises positioning the rear face of the vertical connector web of a first one of the truss hold-down connectors adjacent a front side of a vertical truss web of the truss such that a portion of the vertical truss web is received within the truss web receiving area of the first one of the truss hold-down connectors. In addition, the method comprises attaching at least one of the first and second attachment tabs of the first one of the truss hold-down connectors to a portion of the vertically extending truss web and attaching the attachment leg of the first one of the truss hold-down connectors to the bearing member. The method also includes positioning the rear face of the vertical connector web of a second one of the truss hold-down connectors adjacent a rear side of the vertical truss web such another portion of the truss web is received within the truss web receiving area of the second one of the truss hold-down connectors and attaching at least one of the first and second attachment tabs of the second one of the truss hold-down connectors to another portion of the vertically extending truss web. In addition, the method comprises attaching the attachment leg of the second one of the truss hold-down connectors to the bearing member.

As can be appreciated from the forgoing, the various embodiments of the present invention address the shortcomings of other truss hold-down connectors and methods of attaching a truss to a bearing member. Those of ordinary skill in the art will readily appreciate, however, that these and other details, features and advantages will become further apparent as the following detailed description proceeds.

BRIEF DESCRIPTION OF THE DRAWINGS

In the accompanying Figures, there are shown present embodiments of the invention wherein like reference numerals are employed to designate like parts and wherein:

FIG. 5 is a front elevational view of a truss hold-down connector embodiment of the present invention;

FIG. 6 is a top view of a truss hold-down connector embodiment of FIG. 5;

FIG. 7 is a side elevational view of the truss hold-down connector embodiment depicted in FIGS. 5 and 6;

FIG. 21 is a side elevational view of another truss hold-down connector embodiment of the present invention; and FIG. 22 is a plan view of another truss-hold-down connector embodiment of the present invention prior to bending.

DETAILED DESCRIPTION OF THE INVENTION

Figure 1:
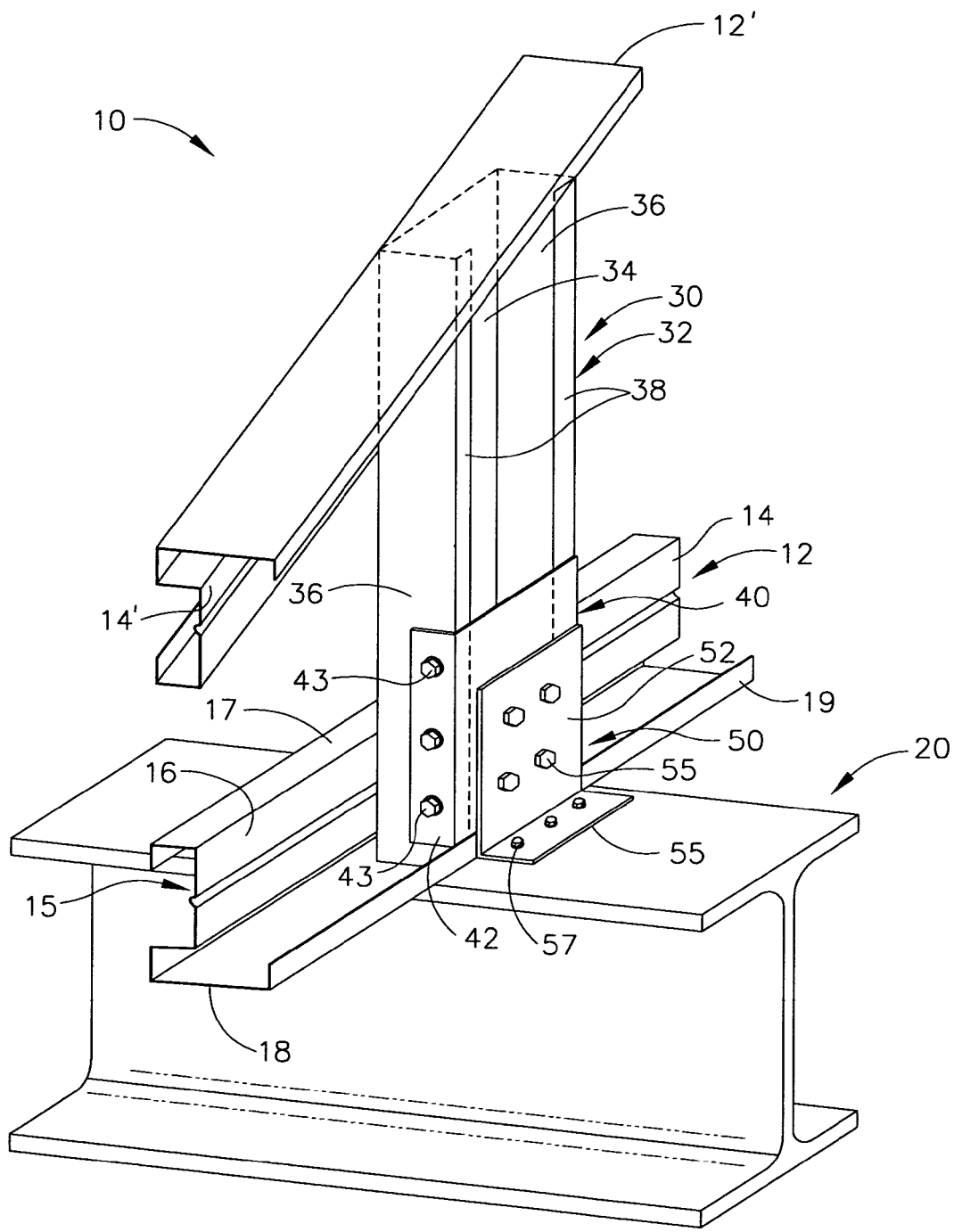
FIG. 1 is a perspective view of a portion of a prior truss arrangement attached to a bearing member in the form of an I beam.
Figure 2:
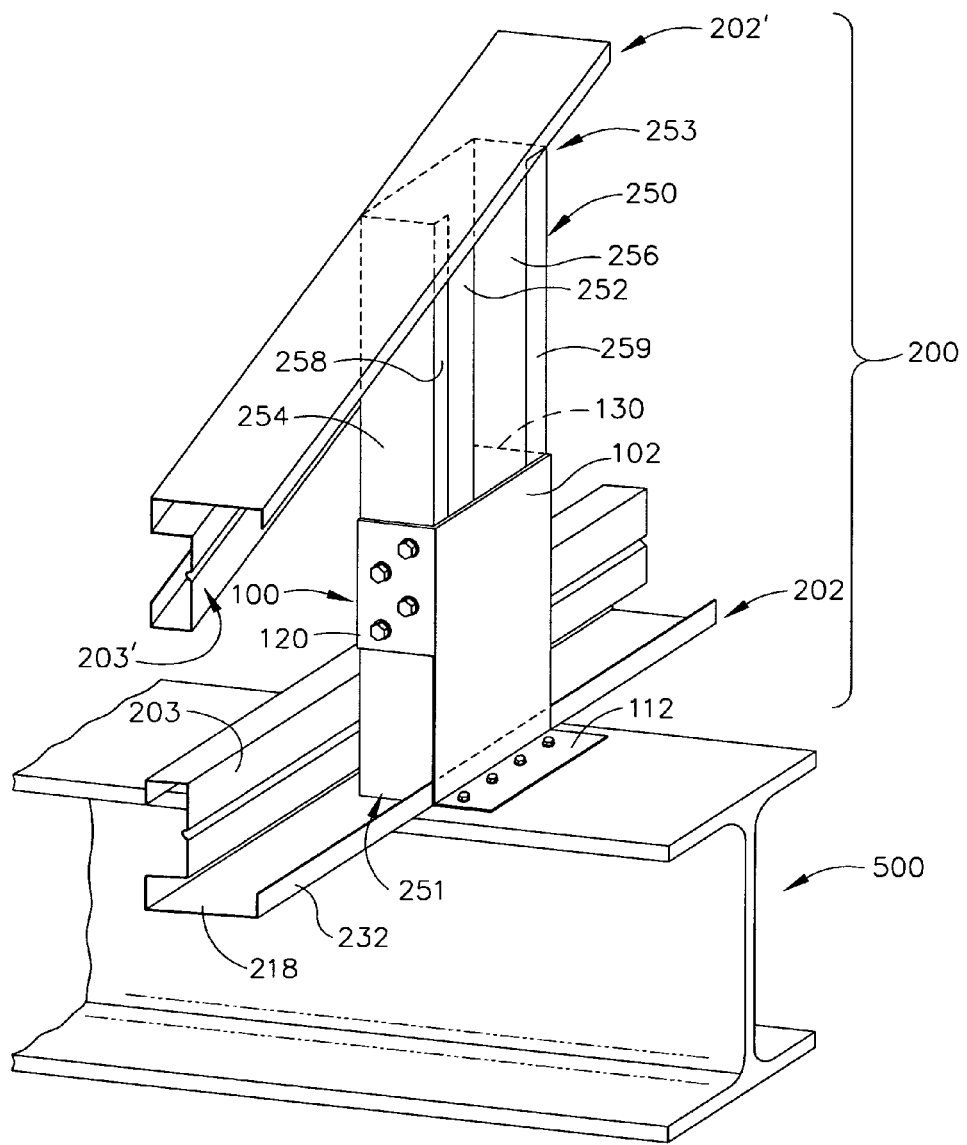
FIG. 2 is a perspective view of a truss hold-down connector embodiment of the present invention attaching a portion of a truss to a bearing member in the form of an I-beam.

Referring now to the drawings for the purposes of illustrating the present embodiments of the invention only and not for the purposes of limiting the same, FIGS. 2-7 illustrate a truss hold-down connector 100 of one embodiment of the present invention used to attach the vertically extending truss web 250 of a truss 200 to a bearing member 500. The bearing member 500 depicted in FIG. 2 is a conventional I beam. Those of ordinary skill in the art will understand, however, that the various truss hold-down embodiments of the present invention may be used to affix trusses to a variety of different bearing members in the form of, for example, girders, walls, plates, etc. without departing from the spirit and scope of the present invention. Thus, the various embodiments of the present invention should not be limited in any way to the type of bearing member on which the truss or other similarly constructed member is to be attached.

Furthermore, as the present Detailed Description proceeds, the skilled artisan will understand that the various embodiments of the present invention may also be effectively employed in connection with a variety of different structures fabricated from components similar to those components discussed herein. It is conceivable, however, that such structures may not fit within the conventional definition of a truss. Thus, the protection afforded to the various embodiments of the present invention should not be limited to solely use in connection with trusses of the type and configurations described herein.

Turning to FIG. 2, the truss 200 depicted therein includes a lower truss chord 202. In the arrangement depicted in FIGS. 2 and 3, the lower truss chord 202 comprises a truss chord of the type described in U.S. Pat. No. 5,457,927 to Pellock et al., the relevant portions of which are herein incorporated by reference. Again, however, those of ordinary skill in the art will appreciate that the lower truss chord 202 of the truss 200 may also be fabricated from, for example, C-shaped member (such as those shown in FIGS. 12 and 13) and other shapes/profiles. Thus, the various embodiments of the present invention should not be limited to use in connection with the type of lower truss chord 202 depicted in FIGS. 2 and 3.

Figure 3:
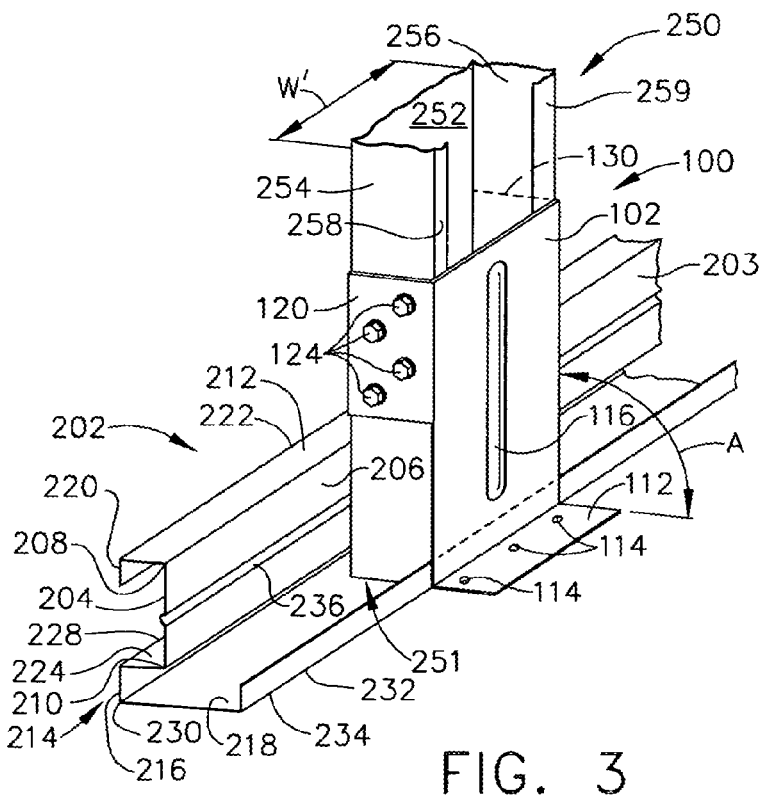
FIG. 3 is another perspective view of a truss hold-down connector embodiment of the present invention attached to a vertically extending truss web and lower truss chord of a truss.

As can be seen in FIG. 3 the lower truss chord 202 of each truss comprises an elongate chord member formed as disclosed in the aforesaid prior U.S. Pat. No. 5,457,927 of sheet metal with such a shape in cross-section as to have a chord web 203 having first and second faces 204 and 206 and first and second longitudinal edges 208 and 210, a first relatively narrow flange 212 extending laterally outwardly from the first face 204 of the chord web 203 at the first (the edge 208) of said longitudinal edges, and further to have a formation (which may be referred to as the head formation) indicated in its entirety by the reference 214 integrally joined to the chord web at the second (the edge 210) of the longitudinal edges of the chord web 203. More particularly, this formation has a portion 216 offset laterally outwardly from said first face 204 of the chord web 203 and a generally flat reentrant portion 218 extending back over the second edge 210 of the chord web 203 and spaced outwardly from said second edge 210 constituting what may be referred to as a head for the elongate sheet metal member. The flange 212 is generally flat, extends out from the first face 204 of the chord web 203 generally at right angles to the chord web, and has a relatively narrow, generally flat reentrant lip 220 at its outer edge 222 generally at right angles thereto. The aforesaid formation 214 specifically comprises a flange 224 constituting a second flange on the chord web 203 extending laterally outwardly from the first face 204 of the chord web 203 at the second longitudinal edge 210 of the chord web 203, a relatively narrow generally flat web constituting the aforesaid offset portion 216 offset laterally outwardly of the plane of the chord web 203 and extending from the outer edge 228 of the said second flange 224 in the direction away from the first flange 212 generally at right angles to the second flange 224. The portion 218 extends laterally from the outer edge 230 of the narrow offset web 216, being integrally joined thereto and having a reentrant lip 232 at its free edge 234 extending generally at right angles thereto in the direction back toward the plane of the flange 224. The face 206 of the chord web 203 may be referred to as the face or front of the lower truss chord 202. The web portion 216 of the head formation 214 and the lip 220 are coplanar and their outside faces form what may be referred to as the back of the lower truss chord 202.

As described in the aforesaid U.S. Pat. No. 5,457,927, the truss chords 202 may be cut to the desired length from stock which may be formed with chord webs 203 of different width, as dictated by the span of the truss and the loading on the truss. The stock may be cold rolled of 22, 20, 18, 16 or 14 gauge steel strip, for example, with the web 202 being 2¼ inches wide, 4¼ inches wide or 6 inches wide, for example. The first and second flanges 212 and 224 of the chord member stock are generally equal in width (e.g. ¾ inch wide). The narrow offset web 216 is 1¼ inches wide, for example, and the head 218 is 1¾ inches wide, for example. The lips 220 and 232 are each ⅜ inch wide, for example. It will be observed that with the stated dimensions for the chord member stock the head 218 extends one inch beyond the plane of the chord web 203 in the direction away from the narrow web 216. The web 202 of the chord member stock may be formed with a stiffening rib extending lengthwise thereof, a rib 236 being shown herein. It will be noted that the outside dimensions of the chord members as exemplified above approximate the finished dimensions of standard U.S. "2.times.4", "2.times.6" and "2.times.8" lumber sizes, i.e., 1¾".times.3½", 1¾".times.5½" and 1¾".times.7¼". However, other sizes and arrangements may be employed. The aforementioned dimensions are provided as examples only and are not intended to be limiting in any way.

The skilled artisan will understand that the truss 200 also includes one or more upper chords 202'. The truss 200 depicted in FIG. 2 includes two diagonally extending upper chords 202' (only one is shown) that are identical in construction to the chords 202 described above. Although only one vertically extending truss web 250 is illustrated in FIGS. 2 and 3, the skilled artisan will also understand that the truss 200 includes a plurality of vertically extending truss webs 250 that extend between the upper and lower truss chords 202, 202' and are attached thereto.

In the embodiment depicted in FIGS. 2 and 3, the vertically extending truss webs 250 may comprise conventional metal studs that each have a stud web 252 and a first stud flange 254 and a second stud flange 256 protruding therefrom. A first stud return 258 may be formed on the end of the first stud flange 254 and a second stud return 259 may be formed on the second stud flange 256. As can be seen in FIGS. 2 and 3, a lower end 251 of the vertically extending truss web 250 is supported on the reentrant portion 218 that is defined between the chord web 203 and the reentrant lip 232. The lower portion of the stud web 252 is attached to the chord web 203 of the lower truss chord 202 by a plurality of fasteners (not shown) such as self-tapping screws or the like. The upper end 253 of the vertically extending truss web 250 may be similarly attached to the upper chord web 203' of the upper truss chord 202' by corresponding fasteners. See FIG. 2.

Figure 4:
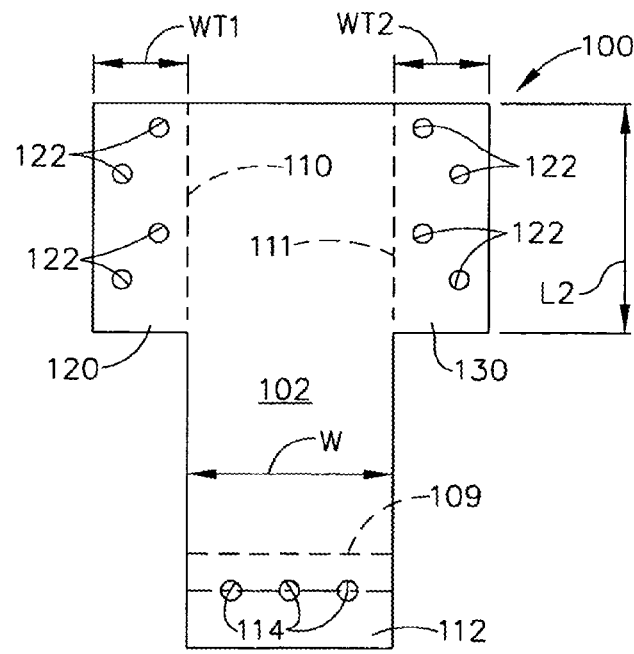
FIG. 4 is a plan view of a truss-hold-down connector embodiment of the present invention prior to bending.

One embodiment of the truss hold-down connector 100 of the present invention is illustrated in FIGS. 2-7. In various embodiments, the hold-down connector 100 may be fabricated from, for example, light gauge steel 0.073" mil thickness. However, other thicknesses and materials could conceivably be used without departing from the spirit and scope of the present invention. Various embodiments of the hold-down connector 100 each includes a vertical connector web 102 having a top end 103, a bottom end 104, a first longitudinal edge 105 and a second longitudinal edge 106. In addition, the vertical connector web 102 has a front face 107 and a rear face 108. See FIGS. 5 and 7. As can be seen in FIG. 4, the hold-down bracket 100 may be fabricated from a flat piece of metal or other material that is cut or otherwise formed in a "T" shape and then bent or otherwise folded along the fold lines 109, 110 and 111 utilizing known fabrication techniques and methods. In particular, a bottom attachment leg 112 is formed by bending the bottom portion 104 of the connector web 102 along fold line 109. For those applications wherein the vertically extending truss web 250 is to extend substantially perpendicularly from the bearing member 500, the angle "A" between the connector web 102 and the bottom attachment leg 112 is substantially ninety degrees. It is conceivable, however, that such angle may be more than ninety degrees or less than ninety degrees depending upon the specific application.

In addition, a first attachment tab 120 may be formed by bending the top portion of the connector web 102 along the fold line 110 such that the first attachment tab 120 extends substantially perpendicularly therefrom along a top portion of the first longitudinal edge 105 (angle "B" in FIG. 6 is substantially ninety degrees). Similarly, a second attachment tab 130 may be formed by bending the top portion of the second longitudinal edge 106 of the connector web 102 along the fold line 111 such that the second attachment tab 130 extends substantially perpendicularly therefrom along a top portion of the second longitudinal edge 106 (angle "C" in FIG. 6 is substantially ninety degrees). In various embodiments, the first attachment tab 120 and the second attachment tab 130 are substantially parallel to each other and serve to define a truss web receiving area generally designated as 140 therebetween. See FIG. 6.

The connector web 102 has a length "L" and the first attachment tab 120 has a length "L1" (FIG. 7) and the second attachment tab 130 has a length "L2" (FIG. 4). In various embodiments, the length "L1" of the first attachment tab 120 is less than the length "L" of the connector web 102 such that a lower portion of the first stud flange 254 is exposed to enable a diagonally extending truss web to be attached thereto as will be discussed in further detail below. See FIGS. 2 and 3. In one embodiment, for example, the length "L" of the connector web may be approximately eight inches and the length "L1" of the first attachment tab 120 may be approximately four inches. However, the lengths "L" and "L1" may vary depending upon the application.

Figure 8:
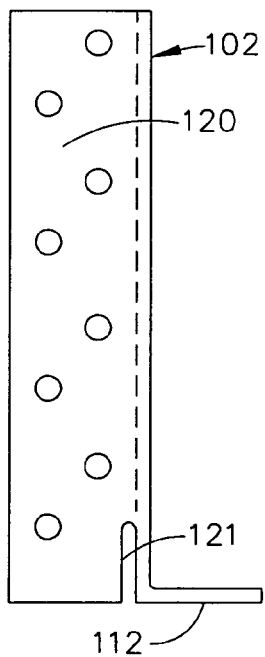
FIG. 8 is a side elevational view of another truss hold-down connector embodiment of the present invention.

Likewise, the second attachment tab 130 may have a length "L2" that is less than the length "L" of the connector web 102. For example, in some embodiments, "L2" may be substantially equal to "L1" and less than "L". In some embodiments, however, "L1" and "L2" may not be equal. For example, in some embodiments, the first attachment tab 120 may extend down the entire first longitudinal edge 105 and a small clearance slit 121 be provided between the attachment tab 120 and the lower end of the connector web 102 for receiving the reentrant lip therein. See FIG. 8. In applications wherein no diagonally extending truss webs are to be employed, the second attachment tab 130 may be similarly constructed. Likewise in applications wherein only one diagonally extending truss web is to be employed, one of the attachment tabs 120, 130 may be provided as shown in FIG. 7 and the other attachment tab may be provided as shown in FIG. 8.

The width "W" of the connector web 102 may be sized such that it is equal to or slightly wider than the width "W" of the stud web 252. For example, the width "W" may be 1/16 inch greater than the width "W". In those embodiments wherein the width "W" of the connector web 102 is substantially equal to the width "W" of the stud web, the first and second attachment tabs 120, 130 of the truss hold-down connector 100 may be slightly flexed outward to permit the attachment tabs 120, 130 to assume the positions depicted in FIGS. 2 and 3. The first attachment tab 120 may then be attached to the first stud flange 254 and the second attachment tab 130 may be attached to the second stud flange 256 of the vertically extending truss web 250.

In one non-limiting embodiment, the width "W" is approximately six inches and the width "WT1" of the first attachment tab 120 is approximately 1.1 inches and the width "WT2" of the second attachment tab 130 is approximately 1.1 inches. In various embodiments, the first attachment tab 120 may be attached to the first stud flange 254 by an appropriate number of first fasteners 124 such as self tapping screws or the like. However, other fasteners such as bolts, rivets, welds, etc. could conceivably be used depending upon the anticipated loading conditions and environment.

Figure 9:
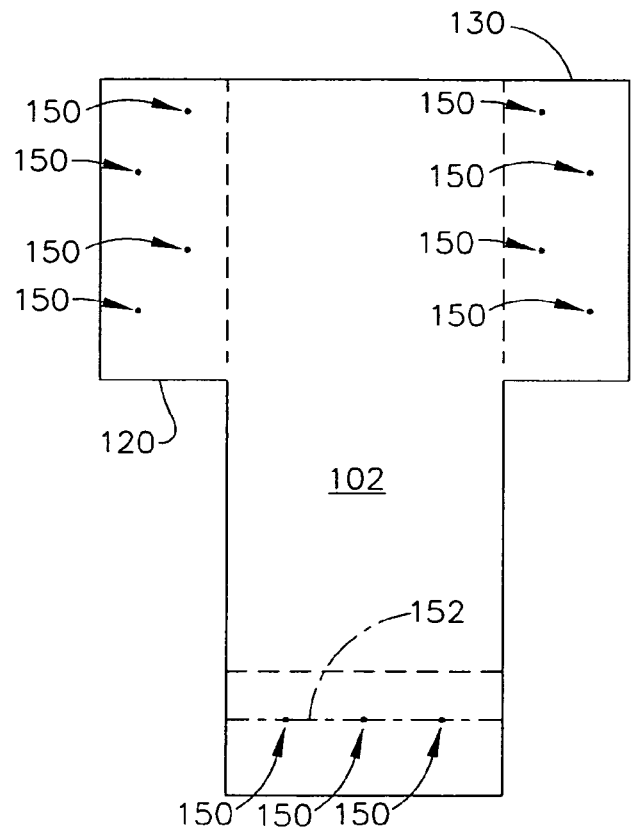
FIG. 9 is a plan view of another truss hold-down connector embodiment of the present invention prior to bending.

To assist in the installation process, an appropriate number of predrilled fastener holes 122 may be provided through the first and second attachment tabs 120, 130. Such arrangement serves to indicate to the installer of the number of fasteners that must be used to ensure that attachment provides the proper loading strength. This eliminates the need for the installer to calculate the number of fasteners needed and their spacing requirements in the field and also serves to reduce the likelihood that an improper number of fasteners and/or an improper fastener spacing scheme is used to connect those components. In other embodiments, however, the fastener holes are not predrilled. In such embodiments, for example, self tapping screws may be used to attach the attachment tabs 120, 130 to the stud flanges 254, 256. In such applications, the holes in the attachment tabs flanges are formed in the field by the fasteners upon installation. In still other embodiments, fastener hole locators such as, for example, dimples 150 or the like may be provided in the attachment tabs 120, 130 to assist the installer in locating the fasteners in the desired spacing scheme. See FIG. 9. In still other embodiments, score lines 152 or a combination of dimples 150 and score lines 152 may be employed to designate the desire fastener arrangements.

Similarly, the bottom attachment leg 112 may be provided with predrilled holes 114 for designating the desired number of fasteners to be used and locating the fasteners at the desired spacing arrangement. However, in other embodiments, no predrilled holes are provided through the bottom attachment leg 112 or fastener locators such as dimples 150 and or score lines 152 are provided in the leg 112. See FIG. 10.

To provide the connector web 102 with additional stiffness, one or more stiffening ribs 116 may be embossed or otherwise formed in the connector web 102. If more than one rib 116 is employed, the ribs may be located, sized and configured to provide the desired amount of stiffness to the connector web 102. For example, one or more elongated stiffener ribs may be oriented such that they are substantially parallel to each other.

Other arrangements may include one or more elongated segmented ribs wherein a portion of the web material is not embossed between rib segments. In still other embodiments, the ribs may intersect each other to form one or more X-shaped configurations, etc.

One advantage of a truss hold-down connector embodiment of the present invention is the ability to attach the connector 100 to a corresponding vertically extending truss web 250 after the truss 200 has been assembled. To attach the truss hold-down connector 100 to the truss web 250, the connector 100 is oriented relative to the web as shown in FIGS. 2 and 3 to enable the first and second attachment tabs 120, 130 to be attached to the first and second stud flanges 254, 256, respectively, with fasteners 124. The bottom attachment leg 112 is likewise attached to the bearing member 500 with screws 126 or other suitable fasteners. Those of ordinary skill in the art will appreciate that the truss hold-down connector 100 may be attached to the truss web 250 and the bearing member 500 by various other suitable fasteners such as bolts, rivets, welds, adhesive, etc. depending upon the materials from which the truss web 250 and connector 100 are made and the anticipated loading conditions.

Figure 10:
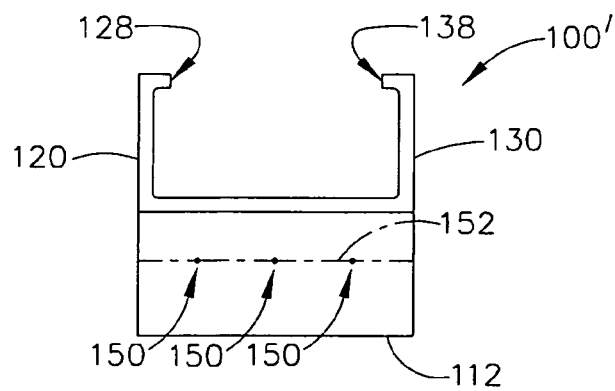
FIG. 10 is a top view of another truss hold-down connector embodiment of the present invention.

Another truss hold-down connector 100' embodiment of the present invention is depicted in FIG. 10. In this embodiment, the connector 100' is identical to the connector 100 described above except that a first return 128 is formed on the end of the first attachment tab 120 and a second return 138 is formed on the end of the second attachment tab 130. Such connector configuration, however, may require the connector to be slid onto the vertically extending truss web 250 before the truss web 250 is attached to the lower truss chord 202 unless the attachment tabs 120, 130 can be sufficiently flexed to permit the connector 100' to be installed around the truss web 250. In an alternative embodiment, only one of the attachment tabs 120, 130 is formed with a return thereon.

Figure 11:
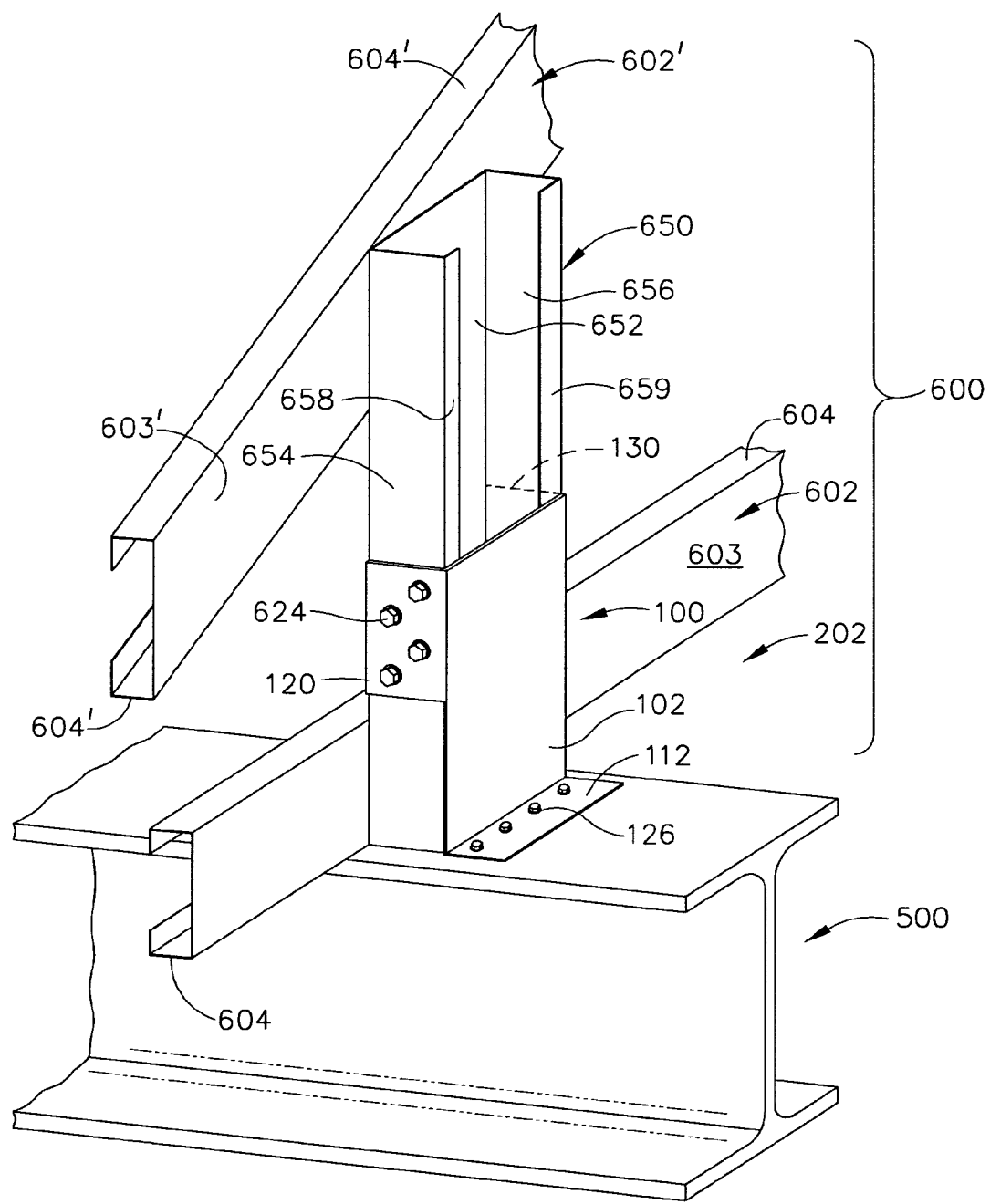
FIG. 11 is a perspective view of a truss hold-down connector embodiment of the present invention attaching a portion of another truss configuration to a bearing member in the form of an I-beam.
Figure 12:
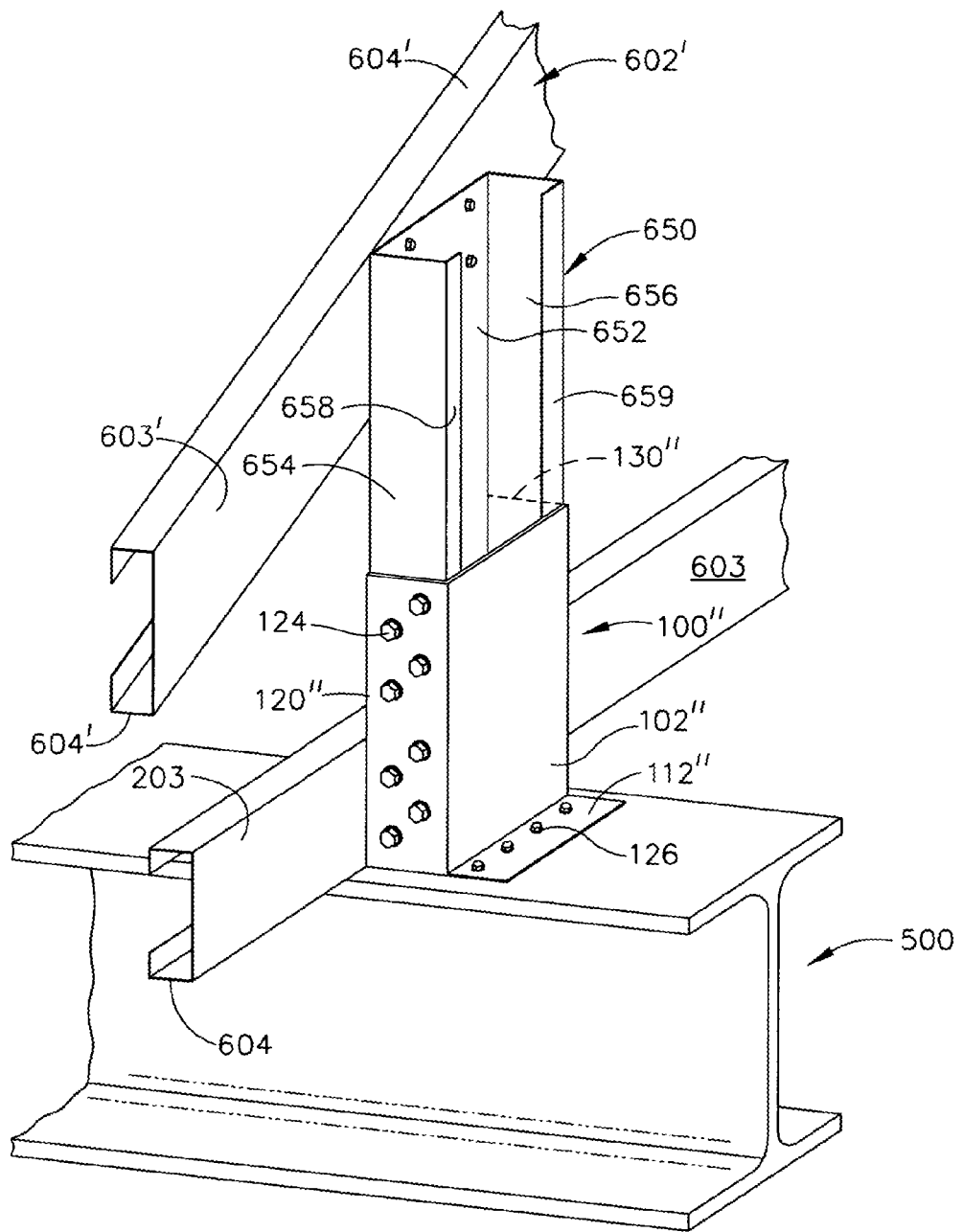
FIG. 12 is a perspective view of a truss hold-down connector embodiment of the present invention attaching a portion of another truss configuration to a bearing member in the form of an I-beam.

FIG. 11 illustrates use of a hold-down connector 100 embodiment in connection with a truss 600 fabricated from conventional C-shaped metal members. In particular, the lower truss chord 602 is formed from a C-shaped stud that has a web 603 and a pair of flanges 604. The upper truss chord 602' is also formed from a similar shaped stud that has a web 603' and a pair of flanges 604'. The vertically extending truss web 650 is also formed from a conventional metal stud that has a web 652 and a first flange 654 and a second flange 656. A first return 658 is formed on the first flange 654 and a second return 659 is formed on the second flange 656. The first attachment tab 120 is attached to the first flange 654 by fasteners 624. Likewise, the second attachment tab 130 is attached to the second flange 656 by similar fasteners. The bottom attachment leg 112 is attached to the bearing member 500 by fasteners 126. FIG. 12 illustrates use of another hold-down connector 100" embodiment of the present invention which is essentially identical in construction to the hold-down connector 100 described above, except that the attachment tabs 120" and 130" extend the entire length of the web 102". Such arrangement enables additional fasteners 124 to be used to attach the first attachment tab 120" to the first flange 654 and the second attachment tab 130" to the second flange 656. The hold-down connector 100" also has a bottom attachment leg 112" that is identical to leg 112 described above and is attached to the bearing member 500 by fasteners 126.

Figure 13:
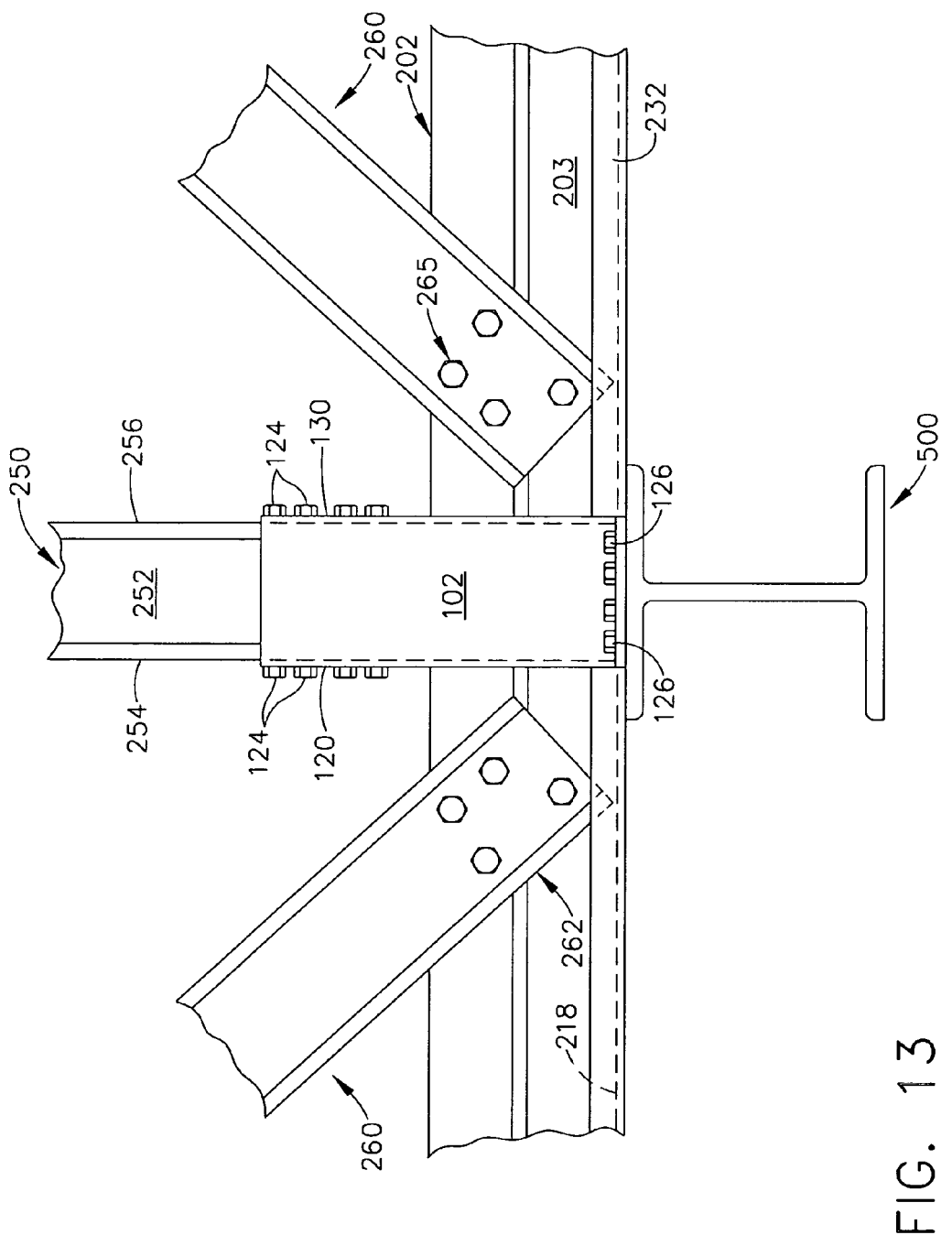
FIG. 13 is a front elevational view of a truss hold-down connector embodiment of the present invention attaching a portion of a truss to a bearing member.

As indicated above, various truss hold-down connector embodiments of the present invention may also facilitate the attachment of one or more diagonally extending truss webs 260 to the vertically extending truss web 250 to which the connector 100 is attached. Such arrangement is depicted in FIG. 13. The bottom ends 262 of the diagonally extending truss webs 260 may be welded to the vertically extending truss web 250 and/or attached to the web 203 of the lower chord 202 with appropriate fasteners 265. Because the first and second attachment tabs 120, 130 are spaced away from the reentrant portion 218 of the bottom truss chord 202 when attached to the vertically extending truss web 250, sufficient clearance is provided to enable the bottom ends 262 of the diagonally extending truss webs 260 to be attached to the vertically extending truss web 250. Those of ordinary skill in the art will appreciate that such unique and novel connector configuration enables the diagonally extending truss webs 260 to be installed after the connector 100 has been installed or the connector 100 may be installed after the diagonally extending truss webs 260 have been installed.

FIGS. 14-20 illustrate truss hold-down connectors 700 of various embodiments of the present invention used to attach the vertically extending truss web 250 of a truss 200 to a bearing member 500. In various embodiments, the hold-down connectors 700 may be fabricated from, for example, light gauge steel 0.073" mil thickness. However, other thicknesses and materials could conceivably be used without departing from the spirit and scope of the present invention. Various embodiments of the hold-down connector 700 each includes a vertical connector web 702 having a top edge 703, a bottom edge 704, a first longitudinal edge 705 and a second longitudinal edge 706. In addition, the vertical connector web 702 has a front face 707 and a rear face 708. See FIG. 16.

Figure 14:
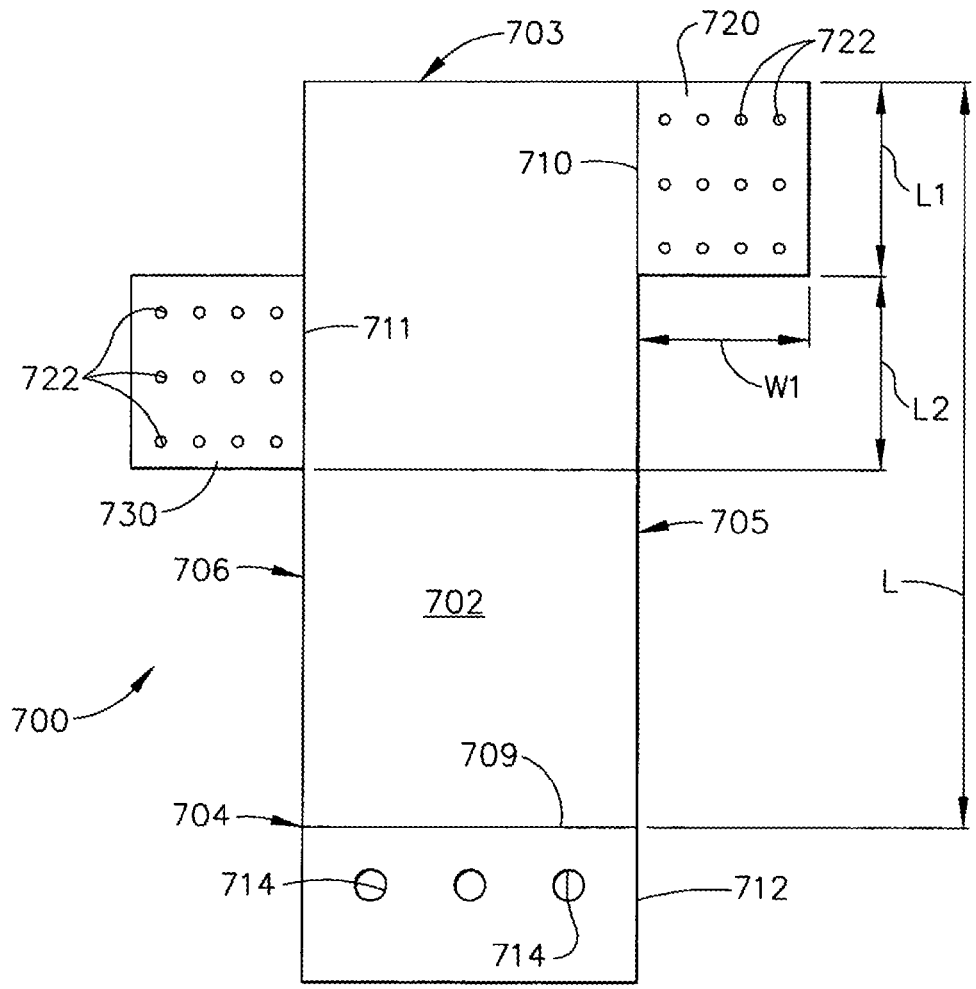
FIG. 14 is a plan view of another truss-hold-down connector embodiment of the present invention prior to bending.

As can be seen in FIG. 14, the hold-down bracket 700 may be fabricated from a flat piece of metal or other material that is cut or otherwise formed in the shape illustrated in that Figure and then bent or otherwise folded along the fold lines 709, 710 and 711 utilizing known fabrication techniques and methods. In particular, a bottom attachment leg 712 is formed by bending the bottom portion 704 of the connector web 102 along fold line 709. For those applications wherein the vertically extending truss web 250 is to extend substantially perpendicularly from the bearing member 500, the angle "A'" between the connector web 702 and the bottom attachment leg 712 is substantially ninety degrees. See FIG. 16. It is conceivable, however, that such angle may be more than ninety degrees or less than ninety degrees depending upon the specific application.

Figure 17:
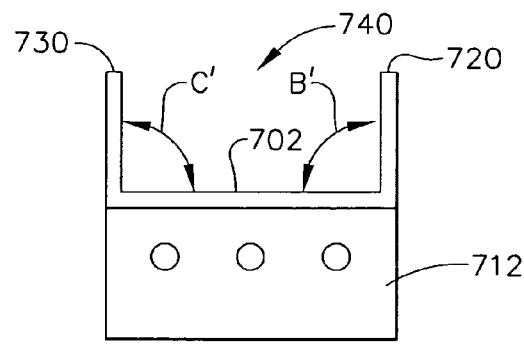
FIG. 17 is a top view of the truss hold-down connector of FIGS. 14-16.

In addition, a first attachment tab 720 may be formed by bending the top portion of the connector web 702 adjacent the top edge 703 thereof along the fold line 710 such that the first attachment tab 720 extends substantially perpendicularly therefrom along a top portion of the first longitudinal edge 705 (angle "B'" in FIG. 17 is substantially ninety degrees). Similarly, a second attachment tab 730 may be formed by bending the portion of material protruding outward from the second longitudinal edge 706 of the connector web 702 along the fold line 711 such that the second attachment tab 730 extends substantially perpendicularly therefrom (angle "C'" in FIG. 17 is substantially ninety degrees) and is substantially longitudinally offset from the first attachment tab 720.

Figure 15:
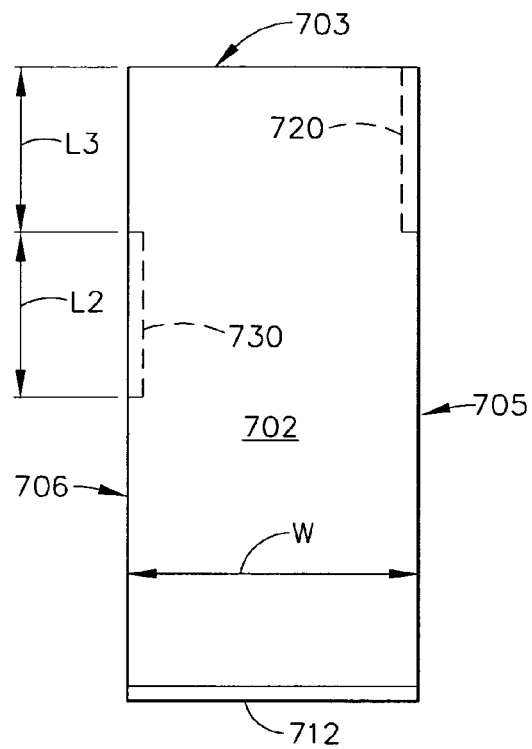
FIG. 15 is a front elevational view of another truss hold-down connector embodiment of the present invention.
Figure 16:
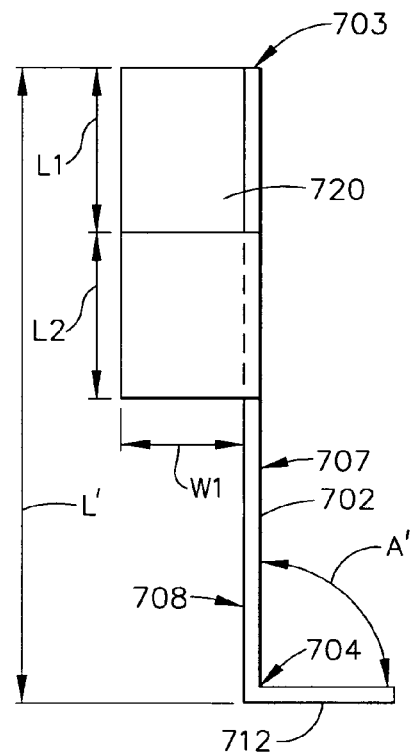
FIG. 16 is a side elevational view of the truss hold-down connector of FIGS. 14 and 15.
Figure 19:
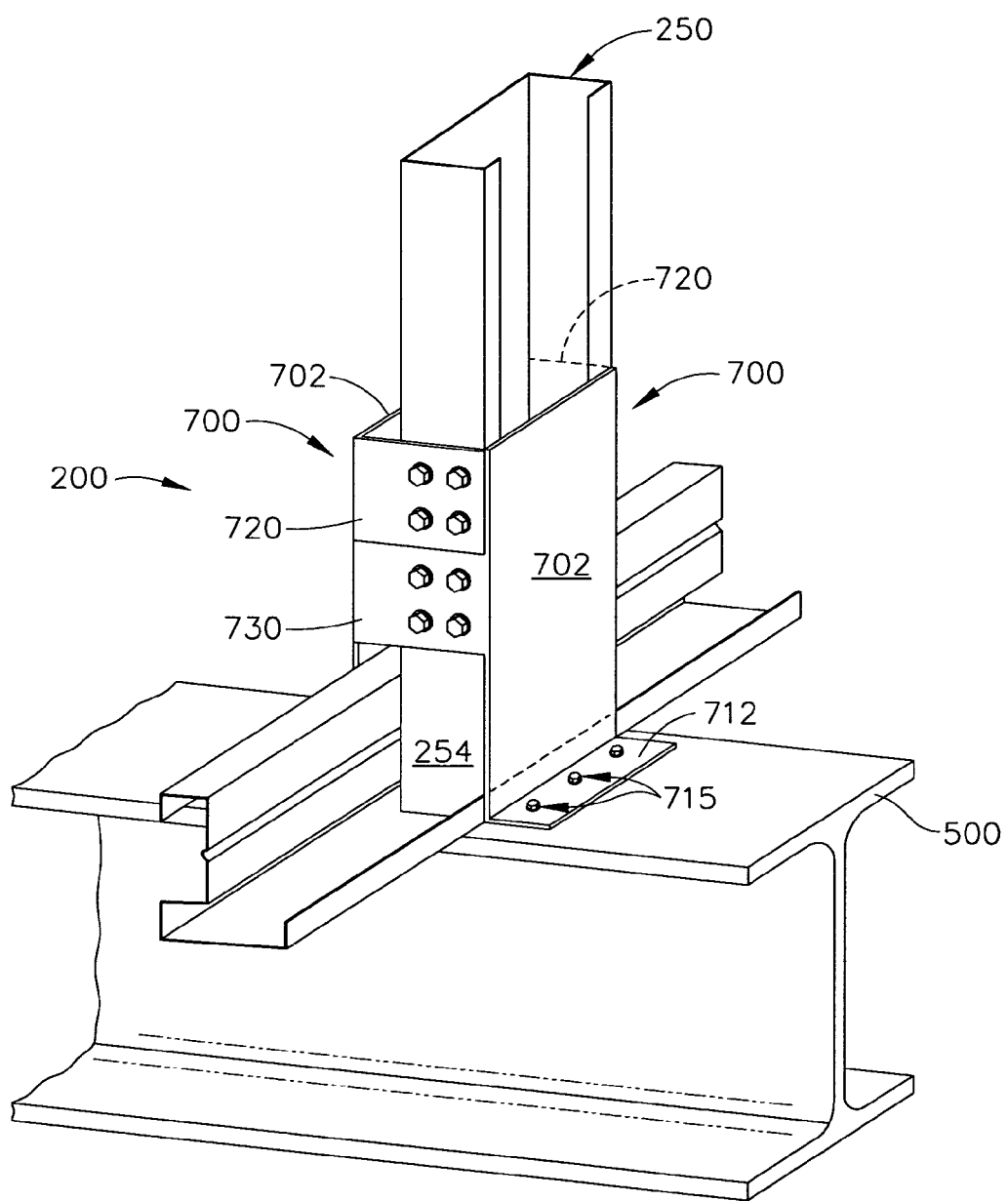
FIG. 19 is a perspective view of the truss arrangement of FIG. 18 with a second truss hold-down connector embodiment attached thereto.

In various embodiments, the first attachment tab 720 and the second attachment tab 730 are longitudinally offset from each other and serve to define a truss web receiving area generally designated as 740 therebetween. See FIG. 17. The connector web 702 has a longitudinal length "L'" and the first attachment tab 720 has a longitudinal length "L1" and the second attachment tab 730 has a longitudinal length "L2". As can be seen in FIG. 15, the second attachment tab 730 is longitudinally offset from the top edge 703 a distance "L3". In various embodiments, the distance "L3" is substantially greater than or equal to length "L1" of the first attachment tab 120 such that when two hold-down connectors 700 are used as shown in FIG. 19, the first and second attachment tabs 720, 730 of the two connectors 700 are generally staggered. In various embodiments, the lengths "L1" and "L2" are substantially equal and the second attachment tabs 730 are spaced from the lower end 709 such that a lower portion of the first stud flange 254 of the truss web 250 is exposed to enable a diagonally extending truss web to be attached thereto as was described above. In one embodiment, for example, the length "L" of the connector web 702 may be approximately 11⅝ inches and the lengths "L1", "L2" and "L3" are each approximately three inches. However, the lengths "L", "L1", "L2" and "L3" may vary depending upon the application. In some embodiments, "L1" and "L2" may not be equal. For example, in some embodiments, the second attachment tab 730 may be offset distance "L3" from the top edge 703 and otherwise extend down the entire first longitudinal edge 705. A small clearance slit 721 may be provided between the attachment tab 730 and the lower end of the connector web 702 for receiving the reentrant lip therein. See FIG. 21.

Figure 20:
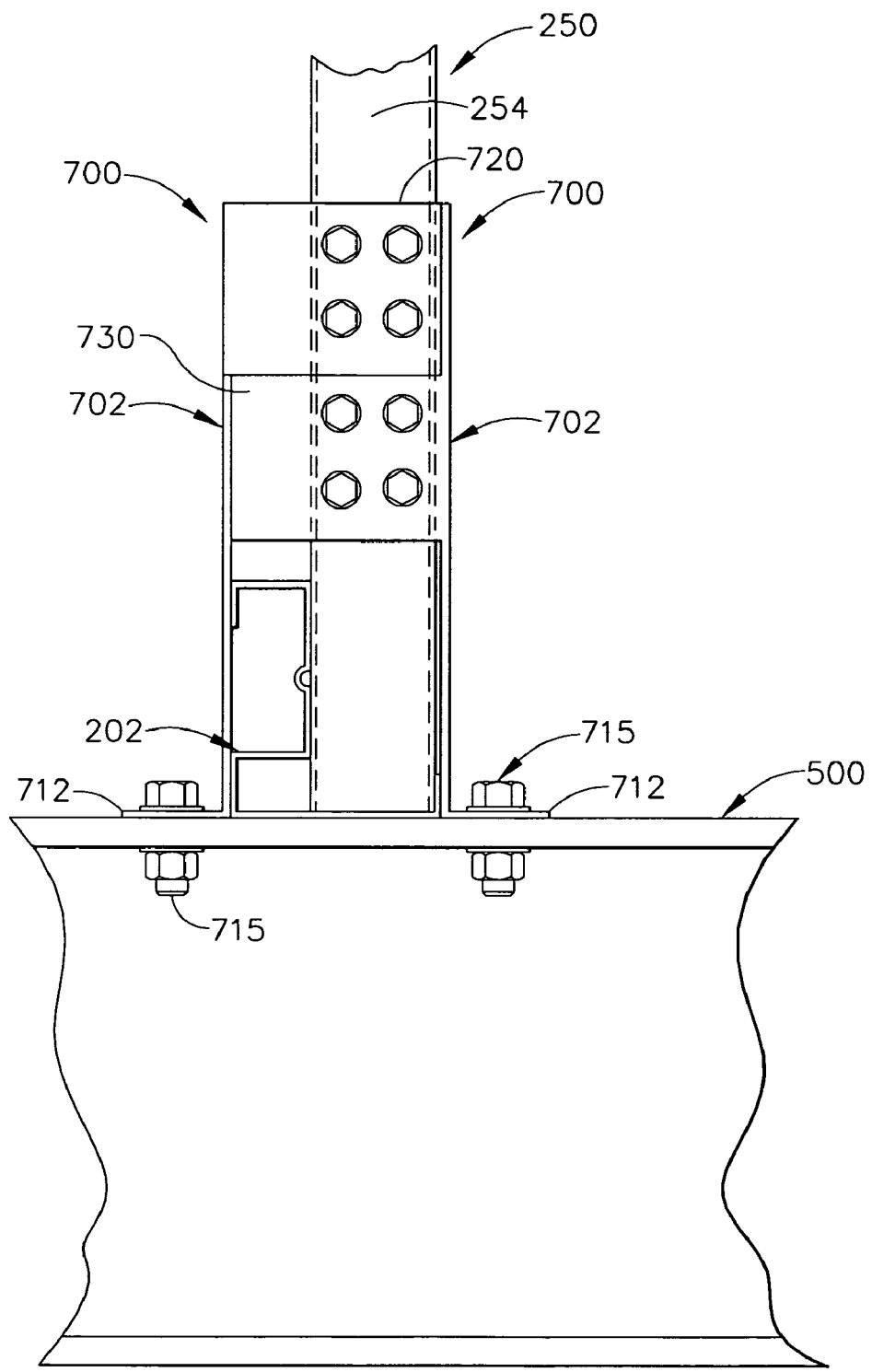
FIG. 20 is a side elevational view of the arrangement depicted in FIG. 19.

As will be discussed in further detail below, a pair of hold-down connectors 700 may be employed to attach a portion of a truss 200 to a bearing member 500. To enable a pair of identical connectors 700 to be employed as shown in FIGS. 19 and 20, the first and second attachment tabs 720, 730 must be wide enough to enable those tabs to be attached to the flanges 254, 256 of the truss web 250. In one embodiment, for example, their widths "W1" may be approximately 2¾ inches.

The width "W" of the connector web 702 may be sized such that it is equal to or slightly wider than the width "W'''" of the stud web 252. For example, the width "W" may be ¹⁄₁₆ inch greater than the width "W'''". In those embodiments wherein the width "W" of the vertical web is substantially equal to the width "W'''" of the stud web 252, the first and second attachment tabs 720, 730 of the truss hold-down connector 700 may be slightly flexed outward to permit the attachment tabs 720, 730 to assume the positions depicted in FIGS. 18 and 19.

Figure 18:
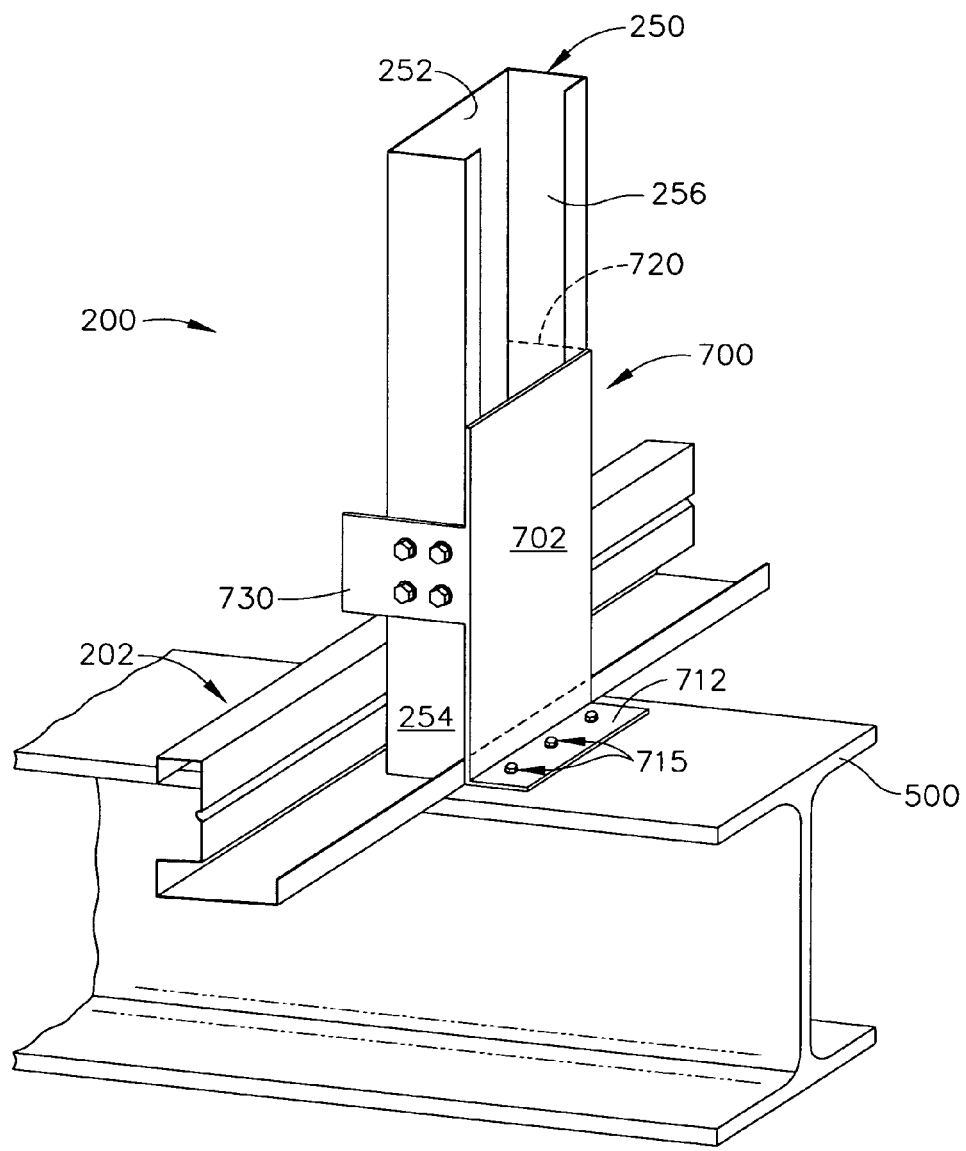
FIG. 18 is a perspective view of a truss hold-down connector embodiment of the present invention attaching a portion of a truss to a bearing member in the form of an I-beam.

In one non-limiting embodiment, the width "W" is approximately 3.635 inches. In various embodiments, one truss hold-down connector 700 is oriented as shown in FIG. 18. The first attachment tab 720 may be attached to the stud flange 256 by an appropriate number of first fasteners 724 such as self tapping screws or the like. However, other fasteners such as bolts, rivets, welds, etc. could conceivably be used depending upon the anticipated loading conditions and environment. To assist in the installation process, an appropriate number of predrilled fastener holes 722 may be provided through the first and second attachment tabs 720, 730. Such arrangement serves to indicate to the installer the number of fasteners that must be used to ensure that attachment provides the proper loading strength. This eliminates the need for the installer to calculate the number of fasteners needed and their spacing requirements in the field and also serves to reduce the likelihood that an improper number of fasteners and/or an improper fastener spacing scheme is used to connect those components. In other embodiments, however, the fastener holes are not predrilled. In such embodiments, for example, self tapping screws may be used to attach the attachment tabs 720, 730 to the stud flanges 254, 256. In such applications, the holes in the attachment tabs and flanges are formed in the field by the fasteners upon installation. In still other embodiments, fastener hole locators such as, for example, dimples 750 or the like may be provided in the attachment tabs 720, 730 to assist the installer in locating the fasteners in the desired spacing scheme. See FIG. 22. In still other embodiments, score lines 752 or a combination of dimples 750 and score lines 752 may be employed to designate the desire fastener arrangements.

Similarly, the bottom attachment leg 712 may be provided with predrilled holes 714 for designating the desired number of fasteners to be used and locating the fasteners at the desired spacing arrangement. See FIG. 14. However, in other embodiments, no predrilled holes are provided through the bottom attachment leg 712 or fastener locators such as dimples 750 and or score lines 752 are provided in the leg 712. See FIG. 22. In the example depicted in FIGS. 18-20, the bottom attachment leg 712 is attached to the bearing member 500 with bolts 715. However other fasteners may be employed.

To provide the connector web 702 with additional stiffness, one or more stiffening ribs 716 may be embossed or otherwise formed in the connector web 702. See FIG. 22. If more than one rib 716 is employed, the ribs may be located, sized and configured to provide the desired amount of stiffness to the connector web 702. For example, one or more elongated stiffener ribs may be oriented such that they are substantially parallel to each other. Other arrangements may include one or more elongated segmented ribs wherein a portion of the web material is not embossed between rib segments. In still other embodiments, the ribs may intersect each other to form one or more X-shaped configurations, etc.

After one of the truss-hold-down connectors 700 is attached to the bearing member 500 and the truss web 250, the second truss hold-down connector 700 is oriented as shown in FIGS. 19 and 20 and attached to the truss web 250 and bearing member 500 in a similar manner. Such use of two identically constructed truss hold-down connectors 700 serves to effectively connect the truss 200 to the bearing member 500 while providing additional support to both sides of the truss web 250. Such truss-hold-down connectors 700 may be provided in kits that contain a pair of truss hold-down connectors and appropriate fasteners for attaching the truss hold-down connectors 700 to the truss webs 250 and the bearing member 500. The use of identically constructed truss hold-down connectors in this manner also eliminates the need to stock different types of truss hold-down connectors at the job site. In addition, the truss hold-down connectors may be attached to the truss after it has been assembled.

The various embodiments of the subject invention represent vast improvements over prior truss hold-down arrangements. The various embodiments of the present invention, employ less components and are easier to install than prior arrangements. In addition, the present connectors may be easy installed on the vertically extending truss webs on trusses that also have one or move diagonally extending truss webs without the problems commonly encountered when using prior connector arrangements.

Any patent, publication, or information, in whole or in part, that is said to be incorporated by reference herein is incorporated herein only to the extent that the incorporated material does not conflict with existing definitions, statements, or other disclosure material set forth in this document. As such the disclosure as explicitly set forth herein supersedes any conflicting material incorporated herein by reference.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A truss hold-down connector, comprising:
    a vertical connector web having a top edge, a bottom end, a front face, a rear face and first and second longitudinal edges;
    a bottom attachment leg protruding outward from said front face at said bottom end of said vertical connector web, said bottom attachment leg configured for attachment to a bearing member;
    a first attachment tab protruding inward from said rear face along a portion of said first longitudinal edge adjacent said top edge of said vertical connector web, said first attachment tab having a first longitudinal length;
    a second attachment tab protruding inward from said rear face along a portion of said second longitudinal edge and being spaced a longitudinally offset distance from said top edge that is greater than or equal to said first longitudinal length of said first attachment tab such that said second attachment tab is substantially parallel to and longitudinally offset from said first attachment tab to define a truss web receiving area therebetween adjacent at least a portion of said rear face of said vertical connector web for receiving a portion of a truss therein; and
    at least one predrilled hole in at least one of said first and second attachment tabs;
    the connector being free of any opposing structure on said second longitudinal edge directly laterally across from the first attachment tab and the connector being free of any opposing structure on said first longitudinal edge directly laterally across from the second attachment tab.

2. The truss hold-down connector of claim 1 wherein said vertical connector web, said bottom attachment leg and said first and second attachment tabs are integrally formed from a single piece of material.

3. The truss hold-down connector of claim 1 further comprising at least one fastener locator in at least one of said bottom attachment leg and first and second attachment tabs.

4. The truss hold-down connector of claim 1 further comprising at least one stiffener member in said vertical connector web.

5. A truss hold-down attachment kit for attaching a truss having at least one vertically extending truss web to a bearing member, said kit comprising:
    a pair of truss hold-down connectors, each said truss hold-down connector comprising:
    a vertical connector web having a top edge and a bottom end, said vertical connector web further having a front face, a rear face and first and second longitudinal edges;
    a bottom attachment leg protruding outward from said front face at said bottom end of said vertical connector web, said bottom attachment leg configured for attachment to the bearing member;
    a first attachment tab protruding inward from said rear face along a portion of said first longitudinal edge adjacent said top edge of said vertical connector web, said first attachment tab having a first longitudinal length; and
    a second attachment tab protruding inward from said rear face along a portion of said second longitudinal edge and being spaced a longitudinal distance from said top edge that is substantially greater than or equal to said first longitudinal length of said first attachment tab such that said second attachment tab is substantially parallel to and longitudinally offset from said first attachment tab to define a truss web receiving area therebetween adjacent at least a portion of said rear face of said vertical connector web for receiving a portion of a truss therein; and at least one predrilled hole in at least one of said first and second attachment tabs;

the connector being free of any opposing structure on said second longitudinal edge directly laterally across from the first attachment tab and the connector being free of any opposing structure on said first longitudinal edge directly laterally across from the second attachment tab.

6. The truss hold-down attachment kit of claim 5 further comprising a plurality of fasteners for fastening the first and second attachment tabs to a truss web and for fastening the bottom attachment leg of each said truss-hold-down connector to the bearing member.

* * * * *